Jan. 31, 1956 F. G. STEELE 2,733,431

QUANTIZER

Filed Nov. 22, 1952

INVENTOR.
FLOYD G. STEELE
BY Walter J. Jason
ATTORNEY 2,733,431
Patented Jan. 31, 1956

2,733,431

QUANTIZER

Floyd G. Steele, La Jolla, Calif., assignor to Digital Control Systems, Inc., a corporation of California Application November 22, 1952, Serial No. 322,096
9 Claims. (Cl. 340—347)

Figure 1:
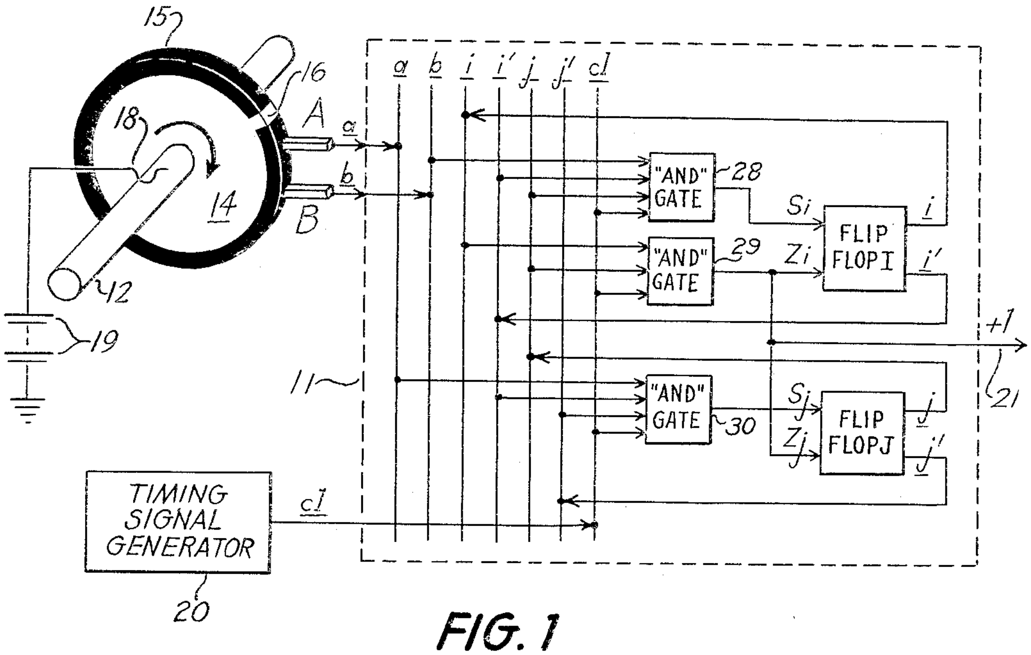

This invention relates to a quantizer and, more particularly, to a quantizer for quantizing off-on input information without introducing logical or transient errors in its output signal.

One means employed in the art for quantizing the rotation of a shaft having, for example, one direction of rotation comprises the obvious expedient of electrically energizing at least one narrow portion or segment on the outer periphery of the shaft and allowing it to contact a single brush. Thus, upon each brush-segment contact, an output signal appears on the brush, each of such signals accordingly representing a predetermined amount of shaft rotation.

This same principle is found in various quantizing problems analogous to the shaft rotational one, and in keying systems, for example, each contact between the movable arm and contact point thereof produces an output signal. In each of these examples and in others not herein noted, one common feature appears, the concept of deriving a single output signal by a single application of energy from the sensing instrument upon each single predetermined amount of movement, be it shaft rotation, a single keying contact, etc.

Although the operational requirements of these devices are clearly defined, certain difficulties have arisen in obtaining the desired correlation between input mechanical information change and output signal change. These difficulties have arisen primarily owing to the mechanical impossibility of always achieving a single contact between the segment and the brush, for example, upon completion of a predetermined shaft rotation, or a single contact between the key arm and contact point upon a given depression of the key. Often, additional brush-segment contacts occur owing to shaft variation, brush bounce, etc., which will, in turn, produce spurious output signals electrically representing shaft rotations which never occurred. In the same manner, the depression of a key arm may, in some instances, result in its bouncing against the contact point which, in turn, will produce spurious output signals representing switching contacts never intended. In the same manner, other quantizing devices analogous to the examples herein presented possess equivalent difficulties in regard to their operation. Operational errors of this type may be termed logical errors since such devices are essentially off-on switches in operation and the above noted spurious output signals act to render inapplicable the logical or Boolean algebra analysis capable of being used in their design or study.

Another variety of error other than logical which these devices are subject to is the type introduced in receiving circuits by transients caused in the transition stage between the no-contact position and complete-contact position of the input switching device. This transition stage may, if movement is slow enough, be marked by electrical arcing with ensuing transients of a relatively high frequency. If the circuit receiving the quantizer output signal is one having a slow response time, such as a relay, etc., such high speed transients are not responded to and hence, produce no undesired effect. However, in certain electronic devices, such as digital computers, utilizing quantized signals, high speed response is normally an inherent property and such transients are likely to be received with considerable error with respect to the information actually intended to be contained therein.

The quantizer of the present invention inherently eliminates by its particular mode of operation all logical and transient errors of the type noted above. It is illustrated in connection with two different types of input devices, one a rotating shaft and the other a keying system, each of which may be encountered in numerous practical applications, such as digital computer input systems or in transmission of digital information over phone lines. The quantizer receiving the shaft rotational input information, for example, contains a pair of input conductors and a pair of flip-flops. An energized conducting segment on the shaft, in making an initial contact with a first input conductor, causes, through an associated diode gating circuit, a first flip-flop to reverse its conduction state. Now, if brush bounce or shaft vibration should occur, with this input conductor receiving additional bursts of energy, nothing further happens since this first flip-flop, with its conduction state already reversed, is immune to further change upon continued application of brush energy thereto.

Upon continuing shaft rotation, the commutator segment next applies energy to the second input conductor. Upon the initial receipt of this energy, several things simultaneously occur. First of all, the second flip-flop has its conduction state reversed and with this accomplished, both flip-flops in synchronization with a clocking signal, then have their reversed conduction states automatically returned to normal with the simultaneous production of a single output signal. If now, additional bursts of energy should be received on the second input conductor, owing to shaft vibration, brush bounce, etc., nothing further happens in the quantizer, the initially received energy having already produced the desired triggering operation.

The quantizer is also illustrated in conjunction with a keying system, the keying system having a pair of contact points connected to the two input conductors, respectively, of the quantizer and arranged to be selectively contacted by an energized movable switch arm. An output signal is produced only by making successive engagements between the two contact points with the movable arm, the resulting operation of the quantizer being here identical to that in the shaft case.

As will be apparent, logical errors are completely eliminated, and transient errors, although appearing in the input lines to the flip-flops, are ineffective to further change their conduction states after their initial triggerings, the flip-flops acting to isolate the input transients from the quantizer output signals.

Accordingly, it is the principal object of the present invention to provide a device for quantizing off-on input information without introduction of logical or transient errors.

Another object of the present invention is to provide a device responsive to sequentially appearing first and second signals on first and second conductors, respectively, for producing a single output signal corresponding thereto.

Still another object of the present invention is to provide a device for quantizing the motion of an input device without introduction of logical or transient errors, each input motion being represented by sequentially appearing first and second signals.

Another object of the present invention is to provide a device for quantizing the rotation of a shaft rotatable in one direction.

A further object of the present invention is to provide a device responsive to each predetermined magnitude of angular rotation of a shaft rotatable in one direction for producing a single output signal.

A further object of the present invention is to provide a device for quantizing the output information produced by a keying mechanism.

A still further object of the present invention is to provide a device for quantizing the output signal of a keying mechanism with the subsequent elimination of all logical and transient errors thereof.

A still further object of the present invention is to provide a device for producing a single output signal in response to each predetermined sequence of application of energy to two contact points of a keying mechanism.

Figure 2:
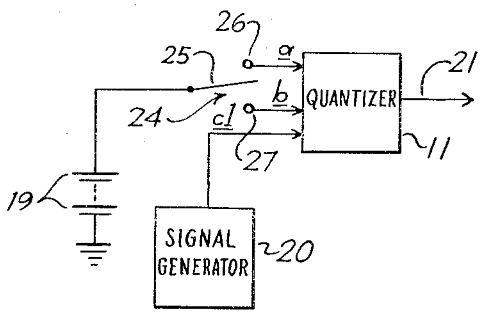

Other objects and features of the present invention will be readily apparent to those skilled in the art from the following specification and appended drawings wherein is illustrated a preferred form of the invention, and in which:

Fig. 1 is a circuit diagram of the quantizer according to the present invention including one use thereof; and Fig. 2 is a circuit diagram illustrating another use of the quantizer according to Fig. 1.

Referring now to the drawings wherein like circuit elements are assigned the same numerical designation, there is illustrated in Fig. 1, a quantizer 11 for quantizing the revolutions of a shaft 12, of conductive material, having only the indicated clockwise direction of rotation as viewed from Fig. 1. Attached to shaft 12 is a disk 14, also of conductive material, having a ring 15 of insulating material extending around a major portion of the periphery thereof but leaving a narrow projection 16 of conductive material extending to the outer edge of the disk. Projection 16 behaves as a commutator segment and makes successive wiping conductive contact with the ends of two brushes, A and B, upon rotation of shaft 12 and serves to apply thereto the potential of battery 19. Brushes A and B are coupled to two of the input conductors of quantizer 11, the signals appearing thereon being designated *a* and *b*, respectively. The output terminal of a timing signal generator 20 is coupled to a third input terminal of circuit 11. Generator 20 may be, for example, a square wave generator, a free running multivibrator circuit, a blocking oscillator circuit triggered from a timing channel on a rotating magnetic memory drum, etc., with its output signal, designated *cl*, in all cases, comprising a series of alternate high and low voltage levels. The high and low voltage levels in signal *cl* correspond in magnitude to the equivalent output levels produced by a pair of electronic switching circuits, such as flip-flops I and J, within circuit 11.

Each of flip-flops I and J may be of a conventional bistable type as found, for example, in Fig. 3 of the copending U. S. application for patent, Serial No. 311,609, filed September 26, 1952, for "Computer and Indicator System," to Floyd G. Steele. Another suitable prior art flip-flop circuit (employing intercoupled triode amplifiers there designated 41 and 42) is shown in Fig. 6 of U. S. Patent 2,537,427 entitled "Digital Servo" by Seid, issued January 9, 1951. Each flip-flop includes a pair of input conductors and a pair of output conductors, the input conductors of flip-flop I, for example, being designated as $S_I$ and $Z_I$, respectively, with the signals appearing on the two output conductors designated *i* and *i'*, respectively. As is well-known in the art, signals *i* and *i'* are complementary to each other in the sense that they may be simultaneously at either high and low, or low and high voltage levels, respectively. The notations assigned to the flip-flop input conductors signify that an input or triggering signal applied to the $S_I$ conductor, taking flip-flop I by way of example, causes signals *i* and *i'* to assume high and low voltage levels, respectively, while a triggering signal applied to the $Z_I$ input conductor causes the output signals *i* and *i'* to assume low and high voltage levels, respectively.

One end of a conductive spring loop 18 is positioned in positive contact with shaft 12 with its other end being connected to the positive terminal of a source of potential, such as battery 19, the negative terminal of battery 19 being grounded. Upon each contact between segment 16 and one of the brushes, the potential of battery 19 is applied to input conductor of circuit 11 corresponding to the brush contacted. The magnitude of this potential should equal the high voltage level produced by flip-flops I and J so as to be capable of operating various gating circuits contained within the quantizer.

Certain mechanical and electrical parameter relationships should be observed for proper quantizer operation. First of all, the physical spacing between brushes A and B measured along the periphery of disk 14 should be greater than the width of segment 16 in order that only one brush be contacted at any given instant. Furthermore, the frequency of timing signal *cl* should be so related to the maximum possible rotational speed of shaft 12, that at least one complete timing interval, measured by the duration of an adjacent low and high level in signal *cl*, will elapse during any given brush-commutator segment contact.

In operation, circuit 11 produces a signal on its output conductor 21 after each completion of a contact sequence between segment 16 and brushes A and B. Stated differently, brush A will first be contacted with no output signal produced but then, upon the subsequent contact of brush B, an output signal will be produced to indicate the completion of the contact sequence. This is accomplished by having the signal appearing on brush A, owing to its initial contact with segment 16, trigger flip-flop J into reversing its conduction state. Now, on the subsequent contact of segment 16 and brush B, in response to the already reversed conduction state of flip-flop J, flip-flop I is triggered into reversing its conduction state. Then, in response to the reversed conduction state sequence of both flip-flops, an output signal is automatically produced as are signals for triggering each flip-flop into its initial or normal conduction states. Upon completion of this last step, quantizer 11 is then prepared for repeating the operation on the next brush A-brush B contact sequence.

The derivation of the specific diode gating circuitry of quantizer 11 to accomplish the above stated operations is most readily understood by referring to the Programming Table included below.

*Programming table*

| Line | Brush Signals | | Content | | To Generate | | Output +1 |
|---|---|---|---|---|---|---|---|
| | *a* | *b* | *i* | *j* | *i* | *j* | |
| 1 | — | — | 0 | 0 | ------- | ------- | ------- |
| 2 | 1 | — | 0 | 0 | ------- | 1 | ------- |
| 3 | X | — | 0 | 1 | ------- | ------- | ------- |
| 4 | — | 1 | 0 | 1 | 1 | ------- | ------- |
| 5 | — | X | 1 | 1 | 0 | 0 | 1 |
| Col | 1 | 2 | 3 | 4 | 5 | 6 | 7 |

In the table, in columns 1 and 2, are included the logical statements representing signal combinations appearing on the respective brush input conductors. Here, the binary digit values of "1" and "0" are electrically represented in the quantizer by high and low voltage levels, respectively, in the unprimed output signal of each flip-flop. In the same way, the appearance of a brush signal, comprising the high voltage level of battery 19, is represented in the table by a binary digit "1." Considering now line 1, defining the condition illustrated in Fig. 1 wherein segment 16 lies without the brushes along the periphery of ring 15, the dash marks appearing in columns 1 and 2 indicate that neither brush has applied thereto, the potential of battery 19. In columns 3 and 4, line 1, are found the contents of flip-flops I and J as represented by the local statements of their respective output signals $i$ and $j$, the binary digit "0" representing the low voltage level in both cases. The next two columns 5 and 6, also blank on line 1, indicate that no change in the signal $i$ and $j$ value is to be generated as long as the segment lies without the brushes as illustrated.

On line 2, the "1" appearing in the 1st or brush A column indicates that rotation of shaft 12 has effected contact between segment 16 and brush A with the ensuing high voltage level of battery 19 appearing in the brush A output signal $a$. During at least the first timing interval of this contact, signals $i$ and $j$ remain at the low voltage level or "0" logical value as indicated in the "To Generate" columns 3 and 4 but, where a "1" signifies as indicated in column 6, the desired triggering operation, flip-flop J is to be triggered at the beginning of the next timing interval to its other conduction state so that output signal $j$ will be high or at its "1" logical value.

The completion of this triggering operation is indicated on line 3 where $j$ equals "1" in column 4, the X in column 1 indicating that this triggering operation has been achieved regardless of whether the A brush is still being contacted by segment 16 or not. In other words, once the initial segment 16-brush A contact is made, the flip-flop J conduction state is to be reversed at the beginning of the following timing interval regardless of whether the contact continues or whether segment 16 approaches, owing to continued shaft rotation, toward contact with brush B.

On line 4 is indicated the timing interval of initial contact between brush B and segment 16. As shown in column 5, the conduction state of flip-flop I is to be reversed at the end of this timing interval to produce a logical "1" or high voltage level in signal $i$. The result of this programming is found in line 5 wherein the X in column 2 indicates again that whether segment 16 moves out of contact with brush B or remains in contact therewith is immaterial. Here, also $i$ and $j$ are both equal to "1" owing to the generation indicated in column 5, line 4, and in accordance with the previously defined operation of circuit 11, an output signal is to be produced on output conductor 21 to thereby indicate the completion of one revolution of shaft 12. This output signal is represented by the "1" appearing in the "Output" column 7.

After contacting brush B, segment 16 will again lie in the position defined on line 1 of the table and in order that the conduction states of flip-flops I and J will again correspond thereto, their reversal is required as shown by the logical "0" in columns 5 and 6, line 5. Thus, at the conclusion of the first timing interval of contact between segment 16 and brush B, flip-flops I and J are to be triggered to produce low voltage levels in their signals $i$ and $j$, respectively, to thereby again provide the conduction state sequence defined on line 1 of the table. Thus, upon further rotations of shaft 12, the programming of the table will repeat and for each complete revolution of the shaft, an output signal will be produced on conductor 21.

The programming table essentially sets forth in tabular form the triggering operations required for flip-flops I and J upon appearance of consecutive signals from brushes A and B to produce an output signal without introducing logical or transient errors. From this table may be written Boolean equations which will, when reduced to corresponding gating circuits and connected to the proper flip-flop input terminals, produce the triggering operations therein set forth. A detailed description of the manner in which such equations may be written from a programming table, such as the one here, besides being known by those skilled in the art, may be found in the previously referred to co-pending application for patent, Serial No. 311,609, the only difference being that here the conventional logical symbol "0" is used rather than the "—1" in the application for denoting a low voltage level.

By employing these principles, the equations defining the gating circuitry to be connected to the respective input conductors of flip-flops I and J as well as output conductor 21 may be written as:

$$S_i=b\cdot i'\cdot j\cdot cl \quad \text{(Eq. 1)}$$
$$Z_i=i\cdot j\cdot cl \quad \text{(Eq. 2)}$$
$$S_j=a\cdot i'\cdot j'\cdot cl \quad \text{(Eq. 3)}$$
$$Z_j=i\cdot j\cdot cl \quad \text{(Eq. 4)}$$
$$+1=i\cdot j\cdot cl \quad \text{(Eq. 5)}$$

The mechanization of the equations, that is deriving the electronic circuitry corresponding thereto, may be effected similarly as described in the referred to application for patent. Accordingly, the remaining circuitry illustrated in quantizer circuit 11 comprises gating circuits corresponding to and connected as implied in the given equations. As will be noted, Equations 2, 4 and 5 are identical, hence necessitating only one gating circuit therefor.

As stated hereinabove "and" gating circuits of the described type are well known in the art. A two terminal prior art "and" gate is shown for example at Fig. 4–2*b*, page 41 of the book "High Speed Computing Devices" by the staff of Engineering Research Associates Inc. published in 1950 by McGraw-Hill. A suitable multi-terminal prior art "and" gate is shown at Fig. 2–2 of an article entitled "Notes on the design of high speed digital computers using transistors," by J. H. Felker—at page 664 of a book entitled "The Transistor" published (copyright 1951) by the Bell Telephone Laboratories.

It should be here noted, as explained in the before mentioned application for patent, the expression $S_i$ for one input terminal of flip-flop I, for example, denotes that a triggering signal applied thereto triggers the flip-flop I conduction state such that output signal $i$ is set to its high level or binary one value. In the same way, a triggering signal applied to the $Z_i$ terminal triggers the flip-flop such that signal $i$ goes low or equals the binary zero value. This same nomenclature is used with flip-flop J.

Equation 1 corresponds to the four terminal "and" gating circuit 28 in Figure 1 receiving signals $b$, $i'$, $j$, and $cl$ on its input terminals and having its output terminal connected to the $S_i$ input conductor of flip-flop I. This "and" circuit is preferably similar in structure to corresponding ones illustrated in detail in the before mentioned application for patent, that is, each of the input terminals thereto passes through a corresponding diode to a common junction in turn connected both to one flip-flop input capacitor and a source of high positive potential through a high values resistor. With this circuit configuration, the common junction potential is maintained at the low voltage level if any of the input signals thereto is low but rises to the high voltage level upon all of the input signals, including the clock, simultaneously being at the high level. Then, when the clock next switches low, the resulting high voltage level charge on the input capacitor is discharged across its corresponding flip-flop grid resistor to thereby trigger the flip-flop. "And" gating circuits of this type are well known in the art and their association with bi-stable flip-flops in the manner diagrammatically here shown being likewise familiar in the digital computer field.

Since Equations 2, 4 and 5 are identical, only one three terminal "and" gating circuit, designated 29 in Figure 1, need be utilized, its output signal being applied, in turn, to the $Z_i$ and $Z_j$ flip-flop input terminals as well as forming the $+1$ output signal from the quantizer. Finally, a four terminal "and" gating circuit 30 receives signals $a$, $i'$, $j'$ and $cl$ on its input terminals with its output signal being applied to the $S_j$ input conductor of flip-flop J.

As will be appreciated by those skilled in the art, each of Equations 1 through 5 may be changed by use of logical tautologies in accordance with Boolean algebra rules without effecting the electronic result produced by the herein illustrated mechanized network. Hence, each of the above equations represents only one equation of a group of equivalent equations representing the electrical function to be achieved.

In considering the operation of quantizer circuit 11, several advantages thereof become apparent. For example, once the J flip-flop has been triggered, owing to a brush A and segment 16 contact, shaft vibrations or brush bounch causing contacts to be alternately made and broken between brush A and segment 16 are incapable of producing any further electrical change in circuit 11 as is evidenced by the X in line 3, column 1. The only action then capable of producing an additional electronic change is a contact between segment 16 and brush B. Such a contact will simultaneously produce an output signal indicating the completion of a shaft revolution and will reset flip-flops I and J to their initial conduction states. Now, after this initial brush B contact, any making and breaking of this contact owing to shaft vibration, etc., will have no further effect on the flip-flops conduction states and no additional output signals will be produced corresponding thereto. Consequently, circuit 11 is free from logical error in the sense that normal shaft vibration, brush bounce, etc., causing a plurality of brush-segment contacts without corresponding shaft revolutions, will have no effect on the circuit's operation and hence cause no spurious output pulses to be produced thereby.

Also, if the edge of segment 16 should, owing to extremely slow shaft rotation, gradually engage the edge of brush A, high frequency transients, owing to a resultant arcing, would constitute input signal *a*, rather than the high voltage level potential of battery 19. Such transients obviously are isolated by flip-flop J from appearing on output conductor 21 and whether they are of sufficient duration to trigger flip-flop J is immaterial to the operation of the quantizer since, when firm contact is finally established between brush A and segment 16, such a triggering will occur.

In the same manner, if segment 16 should subsequently be gradually disengaged from brush A, should gradually engage and gradually disengage brush B, with transients being produced in each instance, no effect is produced thereby in the operation of the quantizer since, as before noted, one the desired flip-flop is triggered, additional similar inputs are ineffective to produce any further charge in the conduction state sequence. Hence, quantizer 11 does not transmit any transient signals appearing on its input terminals.

The program relationships set forth in the programming table are to a great extent arbitrary as will be appreciated by those skilled in the art, although leading in this case to substantially the simplest circuitry capable of producing the stated results. Thus, other relationships might be specified leading to different sets of equations, which when mechanized, would retain the logical properties noted above for the illustrated quantizer circuit 11. One obvious change, for example, would be to define a complete shaft rotation as taking place between brushes B and A rather than the before specified sequence of brushes A and B.

Although only one commutator segment is illustrated, it is obvious that a plurality of equal spaced segments may be employed with an output signal being produced upon completion of each brush A to B contact sequence by one of such segments. With such an arrangement, it is necessary that the spacing between any two of such segments be greater than the brush spacing, the previously cited relationship between brush spacing and commutator segment width also being maintained.

Other types of off-on movement may be converted into corresponding output signals by quantizer 11 which signals will not contain logical and transient errors of the type noted above. For example, there is illustrated in Fig. 2, a key 24 having a movable switch or key arm 25 adapted to make conductive contact with either an upper contact point 26 or a lower contact point 27. Battery 19 is coupled to arm 25 with points 26 and 27 being connected to the quantizer input conductors instead of brushes A and B, respectively, as illustrated in Fig. 1. Finally, timing signal generator 20 is coupled to circuit 11 with the output signal of circuit 11 again appearing on output conductor 21.

In this example, key 24 is contemplated for manual use and any contact between arm 25 and contacts 26 or 27 to be effective, must last for at least one timing interval as measured by the timing signal *cl* from generator 20. If this timing signal is approximately 100,000 cycles per second, for example, then the time of contact need be only ten microseconds to be effective, which duration will be inevitably achieved in any manual operation.

The operator, to produce an output signal on conductor 21, must first engage arm 25 with upper contact point 26 and then engage arm 25 with lower contact point 27. Such a contact sequence corresponds exactly to the brush-commutator segment sequence illustrated in Fig. 1, the operation of quantizer circuit 11 being identical in both cases. If desired, key arm 25 may be spring biased so as to normally contact upper point 26, the operator being required only to direct a downward pressure to actuate the quantizer.

In keying system use, quantizer 11 provides several advantages over keying systems heretobefore utilized, since no spurious or undesired output signals will be transmitted over output conductor 21 upon bouncing of arm 25 on contact 27, or upon arcing transients produced between full-off and full-on contact. Thus, logical and transient keying errors are eliminated and if, for example, this key and quantizer combination is employed for reading input information directly into a digital computer, no input errors of this type will be introduced thereby.

Although quantizer 11 has been illustrated in connection with a shaft input and a key input, it is apparent that other input devices may likewise be used without employing invention. For example, an optical input system utilizing a pair of photocells may be used to count lines on a graph as input data for a digital computer without involving invention.

I claim:

1. In a quantizer wherein each predetermined movement of a movable member produces first and second consecutively appearing signals on first and second conductors, respectively, a device responsive to the consecutive appearance of the first and second signals on the first and second conductors, respectively, for producing an output signal, said device comprising: electronic switching means normally in one conduction state but responsive to the first signal appearing on the first conductor for switching into its other conduction state; and means responsive to the appearance of the second signal on said second conductor when said switching means is in said other conduction state for simultaneously producing an output signal and switching said switching means into its normal conduction state.

2. In a quantizer wherein each predetermined movement of a movable member produces first and second consecutively appearing signals on first and second conductors, respectively, a device responsive to the consecutive appearance of the first and second signals on the first and second conductors for producing an output signal, said device comprising: flip-flop means responsive to signals appearing on said first conductor for triggering into one conduction state; means responsive to the appearance of a signal on said second conductor and said one conduction state of said flip-flop means for producing an output signal; and means responsive to the appearance of a signal on said second conductor and said one conduction state of said flip-flop means for triggering said flip-flop means into its other conduction state.

3. In a quantizer wherein each predetermined movement of a movable member produces first and second consecutively appearing signals on first and second conductors, respectively, a device coupled to the first and second conductors and responsive to the first and second signals appearing consecutively on said first and second conductors, respectively, for producing an output signal, said device comprising: first and second electronic switching means, each of said switching means being normally in a first conduction state; means responsive to an input signal appearing on the first conductor for switching said first electronic switching means into a second conduction state; means responsive to the second conduction state of said first switching means and a signal appearing on said second input conductor for switching said second switching means into a second conduction state; and means responsive to the simultaneous occurrence of the second conduction states of said first and second switching means for simultaneously producing an output signal and switching both of said first and second switching means into their first conduction states.

4. A device for electrically indicating each predetermined movement of a movable member, said device comprising: means for converting each predetermined movement of the movable member into first and second consecutive signals, the second signal appearing simultaneously in time with the completion of said movement; 1st and 2nd electronic switching means, each of said switching means having first and second input conductors, and responsive to signals applied to said first and second input conductors for switching into first and second conduction states, respectively; means responsive to the appearance of the first signal for applying a signal to the second input conductor of said 1st switching means; means responsive to the appearance of the second signal for applying a signal to the second input conductor of said 2nd switching means; and means responsive to the simultaneous appearance of the second conduction states of said 1st and 2nd switching means for simultaneously producing an output signal and for applying signals to the first input conductors of said 1st and 2nd switching means.

5. A device for quantizing the rotation of a shaft, said shaft being rotatable in one direction, said device comprising: means, having first and second output terminals and responsive to a predetermined angular rotation of the shaft, for producing consecutive first and second signals at said first and second output terminals, respectively, said means initiating said second signal after the completion of said first signal; and means responsive to each consecutive appearance of said first and second signals at said first and second output terminals, respectively, for producing an output signal.

6. A device for quantizing the movement of a movable element, said device comprising: means responsive to each predetermined movement of the movable element for producing a pair of sequentially appearing first and second signals, said second signal appearing after the completion of said first signal; and means responsive to each sequential appearance of said pair of signals for producing an output signal.

7. A device for quantizing the keying operations of a keying mechanism, said mechanism including first and second contacts and a movable arm adapted for engagement with either said first contact or said second contact, said device comprising: electronic switching means; a timing signal generator for generating periodic electrical timing signals; and means, coupled to said timing signal generator and responsive to each set of successive time-separated engagements of the movable arm with the first and second contacts of the keying mechanism, for triggering said switching means to produce a single output signal in synchronism with one of said timing signals.

8. A device responsive to the consecutive appearance of a high voltage level in a pair of signals *a* and *b* separately appearing on a pair of conductors, respectively, for producing a single output signal, each of said high voltage levels appearing for at least one timing interval measured by an adjacent high and low voltage level in a timing signal *cl*, said device comprising: an I flip-flop having $S_i$ and $Z_i$ input terminals and producing complementary output signals *i* and *i'*, said I flip-flop being responsive to signals applied to said $S_i$ and $Z_i$ input terminals for producing high and low, and low and high voltage levels in signals *i* and *i'*, respectively; a J flip-flop having $S_j$ and $Z_j$ input terminals and producing complementary output signals *j* and *j'*, said J flip-flop being responsive to signals applied to said $S_j$ and $Z_j$ input terminals for producing high and low, and low and high voltage levels in signals *j* and *j'*, respectively; first means for applying a signal to said $S_i$ input terminal whenever said *b, i', j* and *cl* signals are simultaneously at their high voltage level; second means for applying a signal to said $S_j$ input terminal whenever said *a, i', j'* and *cl* signals are simultaneously at their high voltage level; and third means for simultaneously producing an output signal and applying signals to said $Z_i$ and $Z_j$ input terminals whenever said *i, j* and *cl* signals are simultaneously at their high voltage level.

9. A device responsive to the consecutive appearance of a high voltage level in a pair of signals *a* and *b* separately appearing on a pair of conductors, respectively, for producing a single output signal, each of said high voltage levels appearing for at least one timing interval measured by an adjacent high and low voltage level in a timing signal *cl*, said device comprising: an I flip-flop having Si and $Z_i$ input terminals and producing complementary output signals *i* and *i'*, said I flip-flop being responsive to signals applied to said $S_i$ and $Z_i$ input terminals for producing high and low, and low and high voltage levels in signals *i* and *i'*, respectively; a J flip-flop having $S_j$ and $Z_j$ input terminals and producing complementary output signals *j* and *j'*, said J flip-flop being responsive to signals applied to said $S_j$ and $Z_j$ input terminals for producing high and low, and low and high voltage levels in signals *j* and *j'*, respectively; a first gating network comprising the mechanization of a function of the Boolean equation $b \cdot i' \cdot j \cdot cl$ for applying signals to said $S_i$ input terminal upon electronic satisfaction of its corresponding equation; a second gating network comprising the mechanization of a function of the Boolean equation $a \cdot i' \cdot j' \cdot cl$ for applying signals to said $S_j$ input terminal upon electronic satisfaction of its corresponding equation; and a third gating network comprising the mechanization of a function of the Boolean equation $i \cdot j \cdot cl$ for simultaneously producing an output signal and applying signals to said $Z_i$ and $Z_j$ input terminals upon electronic satisfaction of its corresponding equation.

References Cited in the file of this patent

UNITED STATES PATENTS

| | | |
|---|---|---|
| 1,985,007 | Ashworth | Dec. 18, 1934 |
| 2,590,950 | Eckert et al. | Apr. 1, 1952 |
| 2,656,106 | Stabler | Oct. 20, 1953 |
| 2,685,082 | Beman et al. | July 27, 1954 |